United States Patent Office 3,435,780
Patented Apr. 1, 1969

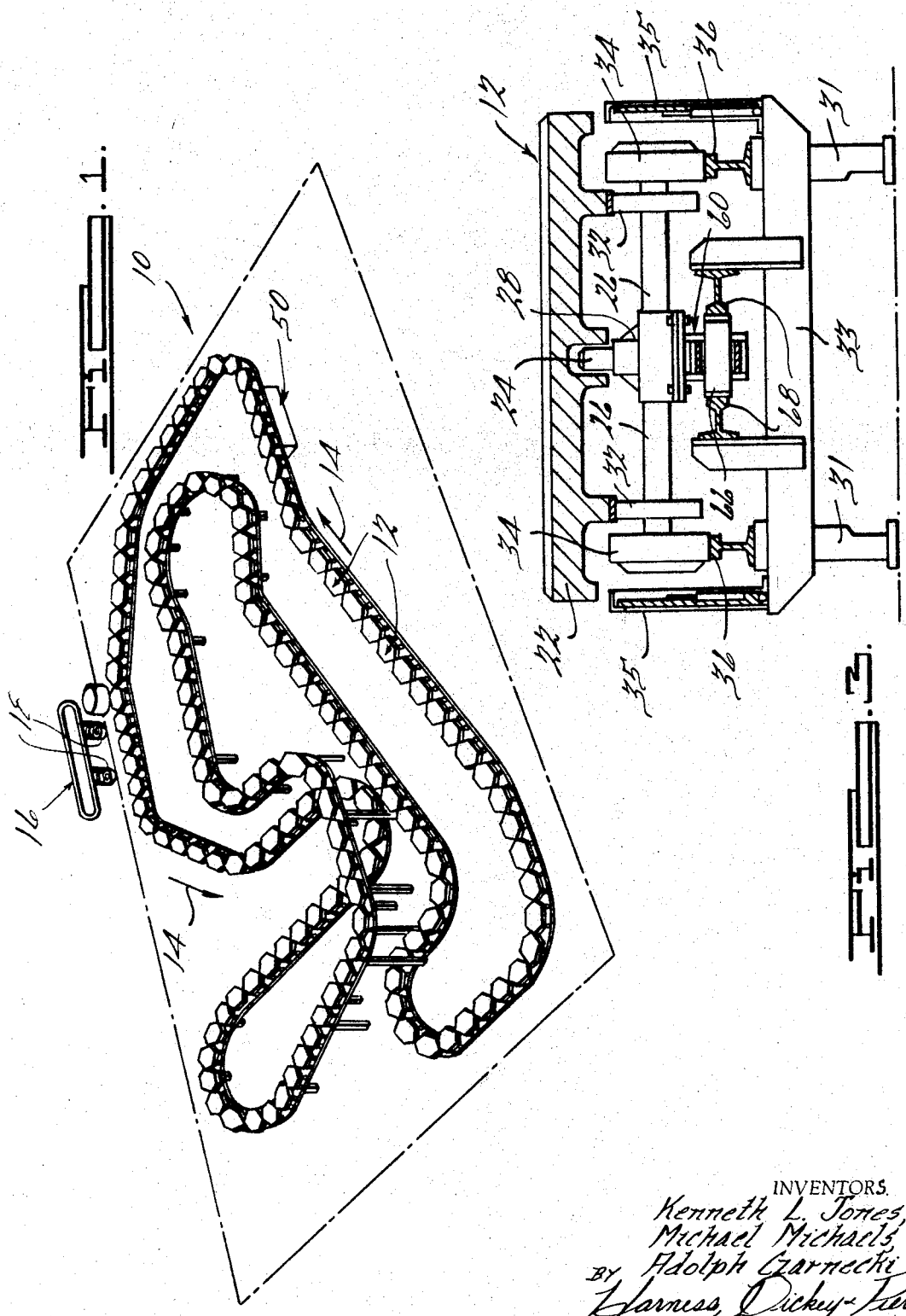

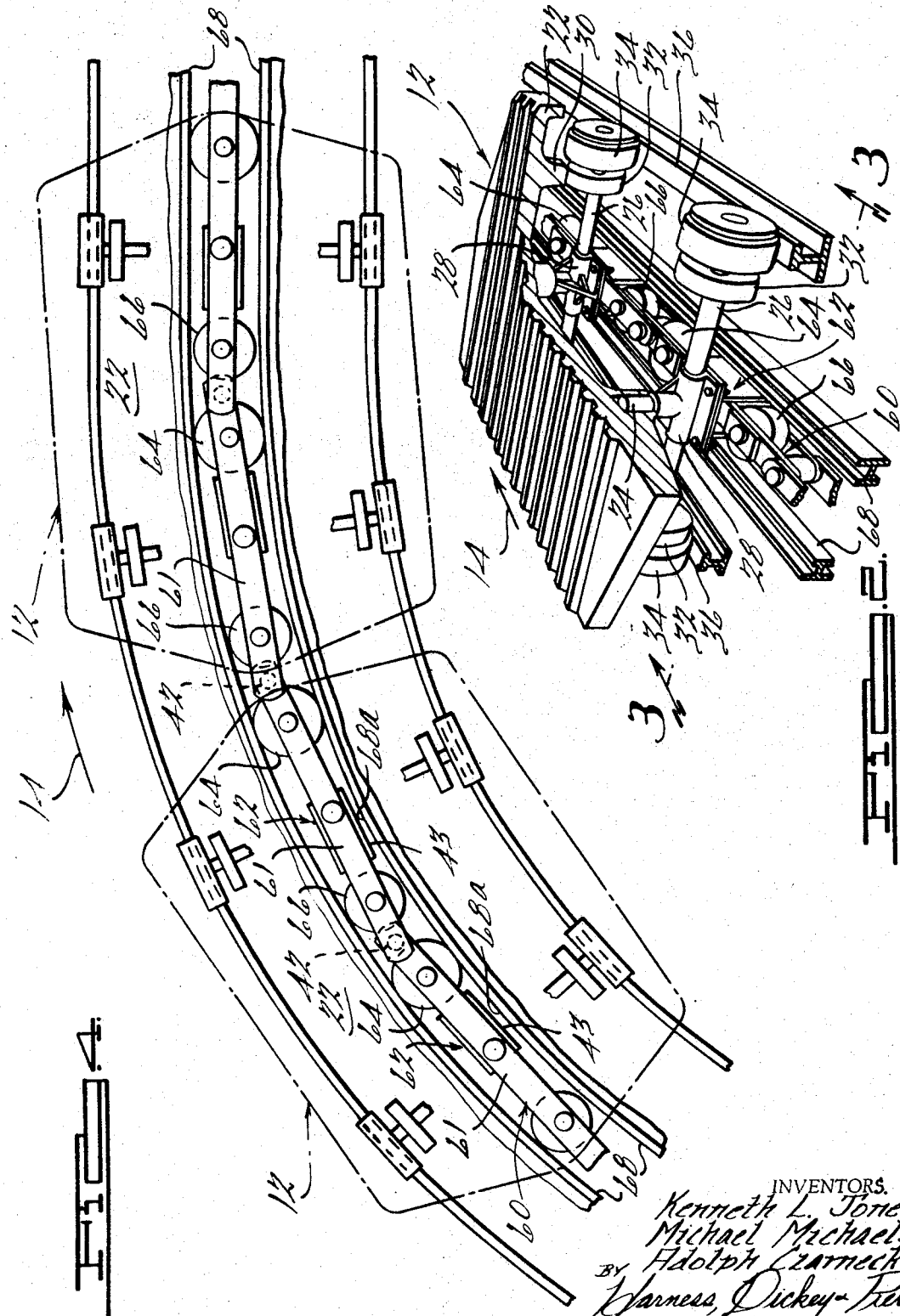

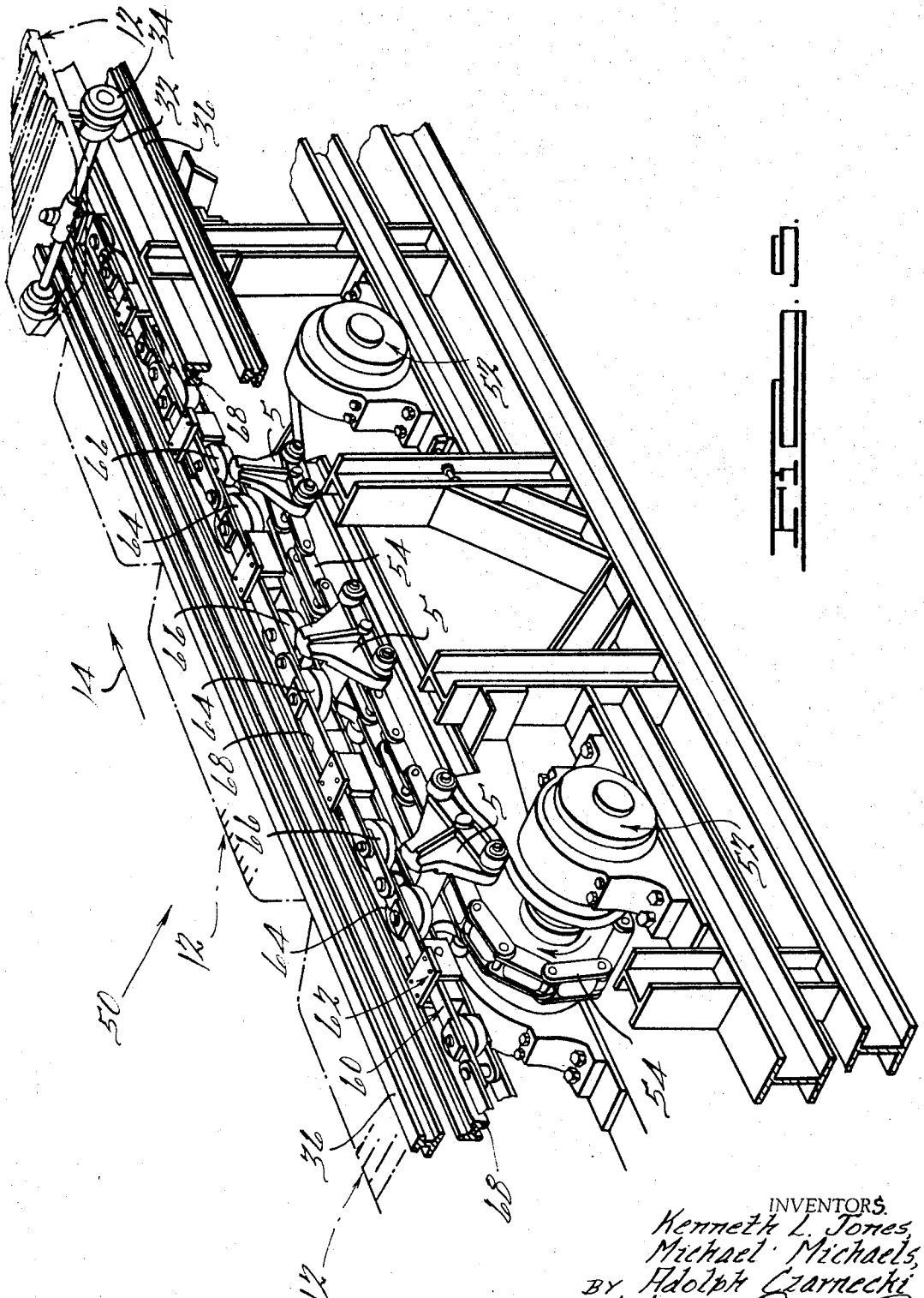

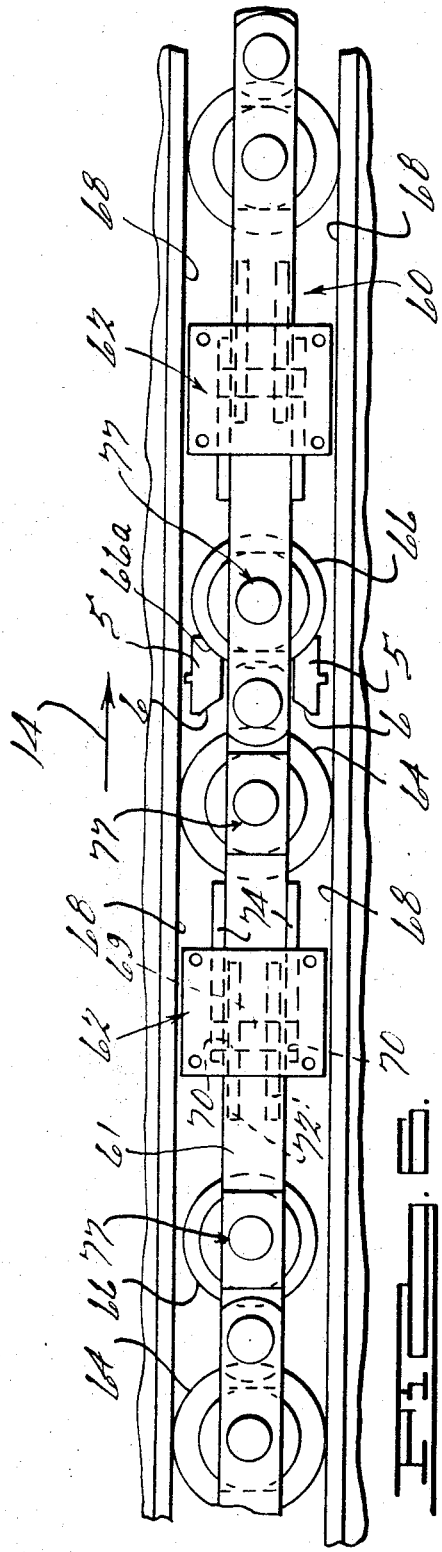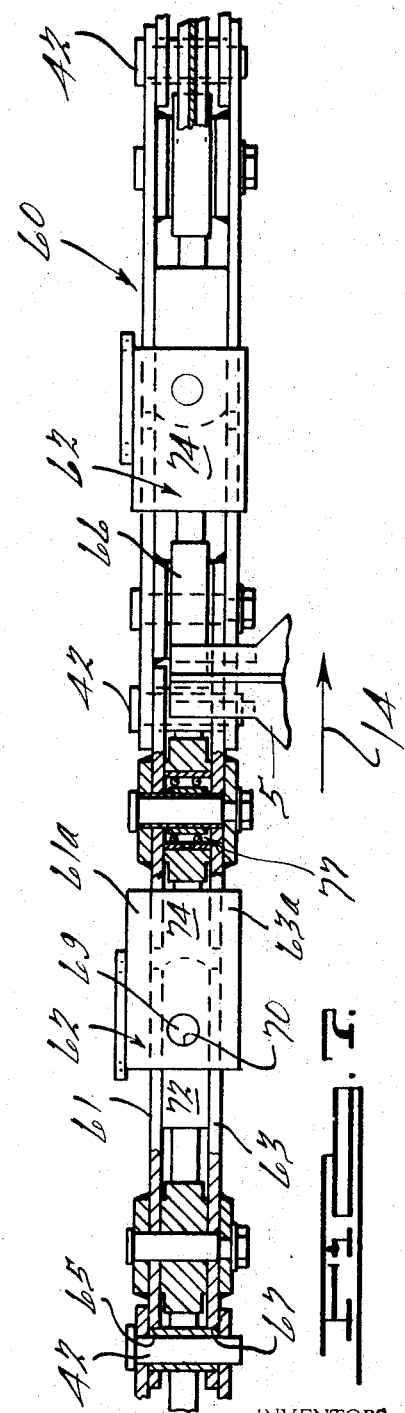

3,435,780
CONVEYOR CONSTRUCTION
Adolph Czarnecki, Birmingham, Kenneth L. Jones, Royal Oak, and Michael Michaels, Novi, Mich., assignors, by mesne assignments, to Standard Alliance Industries, Inc., Chicago, Ill., a corporation of Delaware
Filed Oct. 7, 1966, Ser. No. 585,003
Int. Cl. B61b 7/00, 13/12
U.S. Cl. 104—172     17 Claims This invention generally relates to a conveyor construction. More particularly this invention relates to a conveyor and drive chain therefor for use in foundries or factories for conveying mold equipment, sand, core assemblies, and the like.

In the past, foundry mold conveyors have used drive chains which include wheel type rollers pivotally mounted in the chain for guiding the chain along a track, so to speak, formed by guide rails which determine the path taken by the rollers. The chain is driven by passage through one or more drive units having driving dogs which come into driving contact with the rollers of the chain, clamp the wheels and exert a driving force on the chain. The driving force thereby applied to the chain in turn drives a plurality of mold cars attached to the chain. The mold cars are mounted on wheels for movement on a track along the path taken by the drive chain, and the mold cars conventionally may have a generally flat top thereon which is used as a carrying surface for the item or items being conveyed along the path of the conveyor through the foundry, factory or the like. In conveyors of this general type several problems have been encountered. For example, the rollers used to guide the chain along its path have been mounted on axle type pins which pins are also used to hold together the links of the chain. These pin mounted wheels have been subjected to spillage of tramp metal, sand and the like which material falls from the mold car top to come into contact with the wheel and its pin and thereby lead to jamming or damage of the wheel mounting as well as the connecting structure between chain links. In addition, when such damage occurred, a problem was created because the wheel could not be replaced without taking the chain apart and this of course caused added difficulty in attempting to get the chain back together since the chain is heavy in construction, has a very substantial length, and may utilize two floors of a foundry. The difference in elevation between floors may exert a force on the chain preventing its being fastened together again without difficulty.

A still further problem with prior conveyors results from the fact that when the drive chain passes through arduous curves in the path defined by the guide rails along which the rollers in the chain progress, there is a tendency for the chain or universal members disposed in the links between the rollers, to rub against the guide rails hence causing wear and tear on the chain or the universal member. This rubbing or "chording action" of the chain against the guide rails when the chain is passing through a curve in the path taken by the conveyor is detrimental and impairs the attainment of a long life for the conveyor construction.

One or more drive units as above mentioned are used to drive the chain and the drive units operate through the use of rotating dog members which contact the wheels in driving engagement for a short distance to impart a drive force to the chain and hence move the mold cars. In prior conveyors when the drive chain passed through the driving unit there has been a tendency for the drive chain to wander from its path because the guide rails were not continuously structured through the drive unit, in other words there was a break in the guide rails. Hence this also of course causes the mold car attached to the drive chain to wander from its path. This problem of "wandering" has been caused by the fact that the wheels used in the drive chain are all of the same size and when the wheels were gripped in driving engagement by the dog members of the drive unit, a temporary disengagement of the wheels from the guide rails at the break therein was necessary in order to exert a driving force on the chain, and this temporary disengagement of the wheels from the guide rails has led to a wandering back and forth of the drive chain.

In view of all the above, there has been a heretofore unfilled need in the art for an improved conveyor construction which solves the above problems.

Accordingly, it is a primary object of this invention to provide an improved conveyor construction.

Another object of the invention is to provide an improved conveyor which utilizes a drive chain having rollers positioned within the chain for guiding which rollers are positioned beneath a conveyor car, driven by the chain, to thereby protect the wheels from the damage caused by spillage of items from the top of the conveyor car.

Another object of the present invention is to provide an improved conveyor which has a drive chain with rollers mounted in the chain for guiding, which rollers can be replaced or repaired without disconnecting the chain.

Another object of the present invention is to provide an improved conveyor of a construction which is relatively immune to damage caused by "chording" or rubbing of the chain structure against curves in the path defined by the guide rails for the chain.

Another object of the present invention is to provide an improved conveyor and drive chain construction, driven by dog members which come into temporary contact with the chain structure, which construction prevents wandering of the conveyor when passing through the drive unit.

Another object of the present invention is to provide an improved conveyor driven by a drive unit which conveyor will continue to coast after the drive unit is shut off for only a relatively short distance.

Other objects, features and advantages of the present invention will become apparent from the subsequent description and the appended claims taken in conjunction with the accompanying drawings, in which:

FIGURE 1 generally illustrates a foundry conveyor system including a plurality of conveyor cars operating in a closed loop;

FIGURE 2 illustrates a partially cutaway view of a mold car used in the conveyor system;

FIGURE 3 illustrates a cross sectional view taken generally along line 3—3 of FIG. 2;

FIGURE 4 illustrates a top view partially in phantom showing two adjacent mold cars in conjunction with a chain below the cars which drives the conveyor;

FIGURE 5 illustrates a drive unit for driving the conveyor chain which subsequently transmits the driving force to the conveyor cars;

FIGURE 6 illustrates a top view of the chain for transmitting a driving force to the conveyor; and FIGURE 7 shows a side elevated view of the drive chain of FIG. 6.

Broadly stated, the present invention is a conveyor construction for use in foundries, factories and the like comprising a chain means for transmitting a driving force to a conveyor, and means such as one or more mold cars, for transporting conveyable items in engagement with and driven by the chain means. The chain means includes connector members such as pins and universal members for holding the chain together, and the chain also includes a first and second set of wheels or rollers mounted within the links of the chain. The rollers are kept in contact with means such as guide rails for guiding the rollers along the path to be taken by the chain. The second set of rollers are of smaller diameter than the first set of rollers and this enables the rollers of the smaller diameter to be drivingly engaged by the dogs of a drive unit which propels the chain, and the smaller diameter rollers also enable the chain, as explained more fully hereinbelow, to negotiate curves in the path defined by the guide rails with a relatively large amount of clearance to thereby avoid rubbing of the chain structure against the curved portions of the guide rails.

FIGURE 1, in accordance with the invention illustrates a conveyor system generally designated 10, which is suitable for use, for example in a foundry for conveying mold cars 12 in a direction indicated by the arrows 14 around through a metal pouring and setting operation. The pouring loop is indicated at 16 and the loop includes two pouring ladles 18 from which hot metal can be poured into sand models in core assemblies (not shown) which ride atop the mold cars 12. The conveyor 10 is driven by at least one drive unit 50 described more fully hereinbelow, and the conveyor 10 with the conveyor cars 12 may operate at various elevations as shown in FIGURE 1, and also as shown the conveyor may cross over itself.

FIGURES 2 and 3 more clearly illustrate the mold car 12 as being comprised of a car top 22 on which conveyable items are carried. Car tops 22 are mounted on kingpins 24 which are connected to the axles 26 through the T-connectors 28. The car top 22 in addition to being mounted on the kingpin 24 is also supported by the downwardly extending flange members designated 30 which support the car top on the four bolster wheels 32. Bolster wheels 32 are free-wheeling on the axle 26 and there is normally relative movement between the bolster wheels 32 and flange members 30 only when the conveyor car 12 is negotiating turns. The conveyor car 12 moves along a path taken by the conveyor system by rolling on wheels 34 which are guided along the tracks 36. The chain 60 is held in vertical position and transmits a driving force to the conveyor car 12 due to the connection made between the T-connector 28 of the car 12, which is removably secured to the universal joint 62 of the chain 60. Chain 60 contains a first set of rollers designated 64 and a second set of rollers designated 66 and the rollers 64 and 66 act to guide the chain along its path as defined by the two roller guide rails 68.

FIGURE 3 also shows in cross sectional view of the car 12 along line 3—3 of FIG. 2, that the car 12 and guide rails 68 and 36 may suitably be mounted in elevated position by supporter posts 31 and transverse supporter channel 33. The sides of the elevated conveyor may suitably be protected such as by screens 35.

FIGURE 4 shows a top view of two conveyor cars 12 negotiating a turn in the path defined by guide rails 68 with a direction of movement designated by arrow 14. The chain links 61 bend in movement through the curved path pivot in a horizontal plane, or in a plane parallel to the car top 22, by means of the connector pins 42 which hold the links together. The universal joint 62 provides for vertical articulation of the chain links 61 when the path defined by guide rails 68 is either in an upward or downward direction. Universal joint 62 and connector pins 42 provide the chain links with a universal action by allowing vertical and horizontal articulation respectively.

It should be noted in FIGURE 4 that the use of rollers 66 having a smaller diameter than rollers 64 provides the chain 60 with a unique ability to avoid the rubbing of the inner rail of guide rails 68 at points such as those designated 68a when the chain is negotiating the curve defined by guide rails 68. The structure of chain 60 of the invention provides greater clearance for the chain when it is passing through a curve by reason of the fact that the pivot 42 between chain links can more closely approach the outer rail of the two guide rails 68 due to the fact that roller 66 has a smaller diameter than roller 64 and hence roller 66 since it is smaller and has greater clearance does not prevent chain link 61 from moving away from the inner guide rail to also give the chain greater clearance. In contrast, if the rollers are mounted on the pivot pins 42 as in prior conveyors, pin 42 must then always generally remain equidistant from each of the two rails 68 hence making the clearance of the chain 60 at points 68a markedly smaller and in many instances leading to rubbing of the side walls 74 of the universal joint 62 against the curved inner guide rails generally at 68a.

FIGURES 5, 6 and 7 illustrate a drive unit 50 with driving dog members 5 while at the same time indicating how the dog members 5 engage and drive the chain 60 in a direction of movement indicated by arrow 14. Drive unit 50 may suitably be located on an incline, or alternatively, the drive unit may be located at the top of an incline to pull the conveyor up. Drive pits are not required for the unit 50 although they may be used if desired, for example if the entire conveyor system were to be used on a flat floor setting then drive unit 50 could be mounted in pits. The drive unit 50 may suitably be powered by gear reducer and motor units generally designated 52 and the gear reducer and motor units 52 may incorporate overload protection and variable speed as desired. A multiplicity of drive units 50 would normally be used on relatively long conveyor systems.

Dog members 5 are driven by a roller chain 54 activated by the motor units 52. The dog members 5 travel in a generally oblong path taken by the roller chain 54 and then come up from below the chain 60 to make contact with the smaller diameter rollers 66 for driving engagement therewith. While the rollers 66 are in driving engagement with the dog members 5, the larger diameter rollers 64 are in direct contact with the guide rails 68, except for a small amount of play, to prevent the chain 60 from wandering and hence at the same time to prevent the conveyor cars 12 from wandering off tracks 36 as the chain 60 passes through the drive unit 50. Guide rail 68 is shown broken away on one side of the drive unit 50 in order to more clearly illustrate the driving engagement of the dog members 5 with the chain 60. The guide track 36 on which ride the wheels 34 of the conveyor cars 12 is also shown broken away on the side of drive unit 50 for ease of illustration, whereas in actuality both guide rails 68 and guide tracks 36 would run continuous in straight-through fashion directly through the drive unit 50.

FIGURES 6 and 7 more clearly illustrate the construction of the chain 60 and specifically the contacting relationship between the driving dog members 5 and the rollers 64 contacted thereby; as well as the structure of the universal joints 62 and the operation to permit vertical articulation of the chain 60. As can be seen, chain 60 is formed of upper and lower links 61 and 63, respectively. The links are held together by connector pins 42 which pass through vertically aligned holes 65 and 67 in the chain links 61 and 63, respectively. The universal joints 62 permit vertical articulation of the chain links 61 and 63 through the use of a pivot pin 69 mounted through the aligned holes 70 formed in the interior side plates 72 and the exterior side plates 74, thereby allowing upper and lower chain links 61 and 63 to pivot about the pin 69 in a vertical plane relative to the associated pivotally mounted upper and lower chain links 61a and 63a. FIG. 7 also shows that the rollers are mounted for rotation by pin and ball bearing mountings designated 77.

The driving engagement of dog members 5 with rollers 66 is shown in FIGURE 5 as taking place at the contact surface of the roller designated 66a to move the chain in a direction indicated by the arrow 14. The dogs cam into position to engage and disengage roller wheels 66 without undue wear and the heavy duty antifriction dog rollers 66 absorb the load reaction. From FIGURE 5 it should be evident that when the drive unit is shut down, the chain coasts to a certain extent which is normal due to the momentum of the conveyor. However, the coasting will only be able to take place for a relatively short distance, for example no more than a few inches, due to the fact that the roller 64, which is following along behind the driving dog member 5 will quickly come into contact with the surface 6 of the dog member 5; and a strong resistance to further coasting is set up when the roller 66 contacts the driving dog members 5 to the counteraction against further movement of the dog members caused by the inertia or resistance to rotation inherent in the drive unit and this quickly stops the coasting and prevents excessive movement of the chain once the conveyor drive unit has been shut down. In contrast to this if the guide rollers are mounted on the connector pins as in prior conveyors the driving dog members will not contact the following rollers until at least a few feet of coasting has occurred, and then a certain amount of further coasting will occur before the counteraction from the shut down drive unit stops the conveyor.

FIGURE 5 also illustrates that when the conveyor chain 60 is traveling along a straight path, the rollers 66 which are of smaller diameter than the rollers 64 generally do not contact the guide rails 68 and the actual guiding action on the chain is provided by rollers 64 which generally are in contact with the guide rails 68 whether the chain 60 is moving in a straight path or through a curve as indicated in FIG. 4. As already referred to the leeway allowed between the smaller diameter rollers 64 and the guide rails 68 permits a greatly facilitated clearance between the side walls 74 of the universal joint 62 and the guide rails 68 when the chain 60 is passing through or negotiating a curve such as shown in FIG. 4.

From the above detailed description and drawings it should be apparent that one advantage of the present invention is that the rollers for guiding the chain within the guide rails 68 are completely shielded beneath the car tops 22 of the conveyor cars 12 as shown clearly in FIGURE 4. The shielding of the roller wheels 64 and 66 beneath the car tops 22, protects the pin and bearing mountings generally designated 77 in FIGURE 7 from the spillage of materials such as tramp metal, sand and the like which falls off the conveyor cars 12. The spillage of such materials and penetration thereof into the pin mounting system of the roller wheels of course causes damage and reduces the life of said rollers.

It should also be apparent that since the rollers are not mounted on pins which also form the connecting means between the chain links, that therefore the roller wheels can be replaced without disconnecting the chain itself. Since replacement of the rollers during the life of the conveyor chain 60 is often required and since it is difficult to reconnect the chain once it has been taken apart, the fact that the rollers can be replaced without disconnecting the chain is definitely advantageous.

It should also be apparent from the above description that since two sets of rollers are used in the conveyor chain of the invention, one set of which rollers has a smaller diameter than the other that this thereby leads to the advantageous result of obtaining greater clearance between the chain and the guide rail when the chain is passing through a curve or bend as is often necessary in a conveyor system layout for use in foundries and the like.

In addition, the use of a second set of rollers having a smaller diameter substantially eliminates wandering of the chain when it is passing through the drive unit 50 because the guide rails 68 can run continuously through the drive unit as most clearly shown in FIGURE 6, to thereby allow the larger diameter rollers 64 to contact the guide rails 68 and prevent wandering while the drive dog members 5 contact the smaller diameter rollers 66 for driving engagement with the chain 60. Whereas by contrast in prior conveyor systems utilizing rollers all of uniform diameter, it was necessary for the guide rails such as 68 to be discontinued during passage through the drive unit and hence the drive dog members were primarily relied upon to prevent wandering and in this function the prior art drive dog members had definite drawbacks.

To go further, the use of a second set of rollers 64 having a smaller diameter than the first set of rollers 66 as described in this invention allows the driving dog members 5 to contact the smaller diameter rollers 66 between and immediately adjacent to a larger diameter roller 64, which contacting relationship between dog 5 and roller 66 upon shutdown of the conveyor system prevents excessive coasting of the chain 60 by causing rapid contact with roller 64 at surface 6 of the dog member 5 opposite the drive contact surface 66a between dog 5 and roller 66. This almost immediate contact of roller 64 with the surface 6 of the dog 5 sets up a resistant inertia to continued rotation of the drive unit 50 after it has been shut off to thereby prevent excessive coasting of the conveyor.

While it will be apparent that the preferred embodiments of the invention disclosed are well calculated to fulfill the objects above stated, it will be appreciated that the invention is susceptible to modification, variation and change without departing from the proper scope or fair means of the subjoined claims.

What is claimed is:
1. A conveyor construction for use in foundries, factories and the like comprising:
chain means for transmitting a driving force to the conveyor construction,
first means for transporting conveyable items in engagement with and driven by the chain means, said chain means including:
connector means for holding the chain means together, and a plurality of first rollers disposed within said chain means,
a plurality of first rollers disposed within said chain means,
a plurality of second rollers disposed within said chain means and placed between said first rollers,
guide means for guiding the rollers along a path to be taken by the chain means,
said first and second rollers being positioned beneath said first means to protect the rollers from spillage of an item being conveyed,
said second rollers being of smaller diameter than said first rollers to thereby enable said second rollers to be drivingly engaged in acceptance of a driving force on the chain means, and also to enable said chain means to negotiate curves in said path with relatively facilitated clearance.

2. The conveyor construction as in claim 1 for use in foundries, factories and the like comprising:
chain means for transmitting a driving force to the conveyor construction,
first means for transporting conveyable items in engagement with and driven by the chain means, said chain means including:
connector means for holding the chain means together, and a plurality of first rollers disposed within said chain means,
a plurality of second rollers disposed within said chain means and placed between said first rollers,
guide means for guiding the rollers along a path to be taken by the chain means,
said first and second rollers being positioned beneath said first means to protect the rollers from spillage of an item being conveyed,
said second rollers being of smaller diameter than said first rollers to thereby enable said second rollers to be drivingly engaged in acceptance of a driving force by dog means for driving said second rollers of smaller diameter,
said dog means also acting to immediately come into contact with said first rollers adjacent said dog means upon termination of the driving force to substantially prevent coasting of the chain means.

3. The conveyor construction of claim 1 wherein:
said first rollers prevent wandering of said chain means when said second rollers of smaller diameter are drivingly engaged in acceptance of the driving force.

4. The conveyor construction of claim 1 further characterized as comprising:
chain means for transmitting a driving force to the conveyor construction,
at least one car for transporting conveyable items in engagement with and driven by the chain means, said chain means including:
connector pin means for holding the chain means together, and
a plurality of first rollers disposed within said chain means,
a plurality of second rollers disposed within said chain means and placed between said first rollers,
guide rails for guiding the rollers along a path to be taken by the chain means,
said first and second rollers being positioned beneath each said car to protect the rollers from spillage of an item being conveyed,
said second rollers being of smaller diameter than said first rollers to thereby enable said second rollers to be drivingly engaged in acceptance of a driving force on the chain means, and also to enable said chain means to negotiate curves in said path with relatively facilitated clearance from said guide rails.

5. The conveyor construction of claim 2 wherein:
said first rollers prevent wandering of said chain means when said second rollers of smaller diameter are drivingly engaged in acceptance of the driving force.

6. The conveyor construction of claim 4 wherein:
said first rollers prevent wandering of said chain means when said second rollers of smaller diameter are drivingly engaged in acceptance of the driving force.

7. A conveyor chain construction for use on conveyors in foundries, factories, and the like comprising:
chain means for transmitting a driving force to the conveyor,
connector means for holding the chain means together,
a plurality of first rollers disposed within said chain means,
a plurality of second rollers within said chain means and placed between said first rollers,
guide means for guiding the rollers along a path to be taken by the chain means,
said first and second rollers being positioned in pairs of one each between adjacent connector means,
said second rollers being of smaller diameter than said first rollers to thereby enable said second rollers to be drivingly engaged in acceptance of a driving force on the chain means, and also to enable said chain means to negotiate curves in said path with relatively facilitated clearance.

8. The conveyor chain construction of claim 7 wherein:
said first rollers prevent wandering of said chain means when said second rollers of smaller diameter are drivingly engaged in acceptance of the driving force.

9. A conveyor chain construction as in claim 7 for use on conveyors in foundries, factories, and the like comprising:
chain means for transmitting a driving force to the conveyor,
connector pin means for holding the chain means together,
a plurality of first rollers disposed within said chain means,
a plurality of second rollers within said chain means and placed between said first rollers,
guide rails for guiding the rollers along a path to be taken by the chain means,
said first and second rollers being positioned in pairs of one each between adjacent connector means,
said second rollers being of smaller diameter than said first rollers to thereby enable said second rollers to be drivingly engaged in acceptance of a driving force on the chain means, and also to enable said chain means to negotiate curves in said path with relatively facilitated clearance, and
said first rollers acting to prevent wandering of said chain means when said second rollers of smaller diameter are drivingly engaged in acceptance of the driving force.

10. A mold conveyor chain adapted for use with a conveyor drive unit of the type having pairs of laterally spaced driving dogs and adapted to travel between vertical guide rails, said chain comprising:
a plurality of chain links pivotally interconnected end-to-end by
vertical connector pins,
horizontal rollers journalled in said chain links behind said connector pins and projecting laterally of said links for rolling engagement with vertical guide rails, and
pusher members mounted in said chain links ahead of said connector pins also projecting laterally of said links for engagement by the driving dogs of said conveyor drive unit.

11. A mold conveyor chain comprising:
a plurality of chain links pivotally interconnected end-to-end by
vertical connector pins for horizontal bending of said chain,
a first set of horizontal rollers journaled in said chain links behind said connector pins and projecting laterally of said links for rolling engagement with vertical guide rails for said chain, and
a second set of horizontal rollers journaled in said chain links ahead of said connector pins also projecting laterally of said links for engagement by the driving dogs of a conveyor drive unit, said first set of rollers being relatively larger in diameter than said second set of rollers.

12. A mold chain as defined in claim 11 wherein the rollers of said second set are spaced from the rollers of said first set to accommodate the driving dogs with relatively slight clearance between the rollers of said first set and said driving dogs, whereby to limit overtravel of the chain relative to said dogs.

13. A mold chain as defined in claim 11 including means mounting said rollers for individual removal from said chain without disconnecting any of said chain links.

14. A mold chain as defined in claim 11 in combination with a plurality of mold cars,
said chain being disposed below and drivingly connected to said mold cars and the latter having:
car tops extending over and covering all of said chain rollers whereby to protect the latter from tramp metal and the like to which they otherwise are exposed in use.

15. A mold chain as defined in claim 11 in combination with a plurality of mold cars,
said mold cars being drivingly connected to said mold chain and including:
car tops overlying and protecting all of said first and second set of rollers, and
means mounting said rollers for individual removal from the side of said chain without disconnecting any of said chain links or requiring the removal of said car tops.

16. A mold conveyor chain adapted for use with a conveyor drive unit of the type having pairs of laterally spaced driving dogs and adapted to travel between vertical guide rails, said chain comprising:
a plurality of chain links pivotally interconnected end-to-end by
vertical connector pins,
horizontal guide members positioned in said chain links behind said connector pins and projecting laterally of said links for anti-friction engagement with vertical guide rails, and
pusher members mounted in said chain links ahead of said connector pins also projecting laterally of said links for engagement by the driving dogs of said conveyor drive unit.

17. A conveyor construction for use in foundries, factories and the like comprising:
chain means for transmitting a driving force to the conveyor construction,
first means for transporting conveyable items in engagement with and driven by the chain means, said chain means including
connector means for holding the chain means together, and a plurality of guide members disposed within said chain means in generally transverse position,
a plurality of pusher members disposed within said chain means in generally transverse position and placed between said guide members,
guide means for guiding said guide members along a path to be taken by the chain means,
said guide members and pusher members being positioned beneath said first means to protect said members from spillage of an item being conveyed,
said pusher members being drivingly engaged in acceptance of a driving force on the chain means.

References Cited

UNITED STATES PATENTS

| | | | |
|---|---|---|---|
| 1,792,533 | 2/1931 | Francis | 104—25 |
| 2,168,898 | 8/1939 | Christensen | 198—181 |

ARTHUR L. LA POINT, *Primary Examiner.*

D. E. WORTH, *Assistant Examiner.*

U.S. Cl. X.R.

104—178